United States Patent [19]
Gaddis et al.

[11] Patent Number: 5,457,681
[45] Date of Patent: Oct. 10, 1995

[54] ATM-ETHERNET PORTAL/CONCENTRATOR

[75] Inventors: Michael E. Gaddis; Richard G. Bubenik, both of St. Louis; Pierre Costa, Bridgeton; Noritaka Matsuura, St. Louis, all of Mo.

[73] Assignees: Washington University; SBC Technology Resources, Inc., both of St. Louis, Mo.

[21] Appl. No.: 894,445

[22] Filed: Jun. 5, 1992

[51] Int. Cl.⁶ .................................................. H04L 12/66
[52] U.S. Cl. .......................... 370/56; 370/85.13; 370/94.1
[58] Field of Search .............................. 370/56, 60, 60.1, 370/82, 84, 85.13, 85.14, 94.1, 94.2, 110.1, 108, 118

[56] References Cited

U.S. PATENT DOCUMENTS

| | | | |
|---|---|---|---|
| 5,088,090 | 2/1992 | Yacoby | 370/85.13 |
| 5,101,404 | 3/1992 | Kunimoto et al. | 370/60 |
| 5,113,392 | 5/1992 | Takiyasu et al. | 370/94.1 X |
| 5,136,584 | 8/1992 | Hedlund | 370/94.1 |
| 5,204,882 | 4/1993 | Chao et al. | 370/94.1 X |
| 5,208,811 | 5/1993 | Kashio et al. | 370/94.1 |
| 5,210,748 | 5/1993 | Onishi et al. | 370/60 X |
| 5,214,642 | 5/1993 | Kunimoto et al. | 370/79 X |

Primary Examiner—Melvin Marcelo
Attorney, Agent, or Firm—Rogers, Howell & Haferkamp

[57] ABSTRACT

An ATM-Ethernet portal/concentrator permits a transparent interconnection between Ethernet segments over an ATM network to provide remote connectivity for Ethernet segments. The portal includes an Ethernet controller and an ATM cell processor, both of which receive and transmit data to and from a dual port shared memory under control of a direct memory access controller. A control microprocessor monitors and controls the shifting of data through the dual port memory. In this scheme, original data is written and read directly into and out of the dual port memory to thereby eliminate any requirement for copying of data, to thereby significantly increase the data throughput capability of the portal. In the concentrator embodiment, a plurality of Ethernet controllers, each of which is connected to its own associated Ethernet segment, is multiplexed through the concentrator to an ATM network to thereby provide remote connectivity for each of the Ethernet segments.

13 Claims, 16 Drawing Sheets

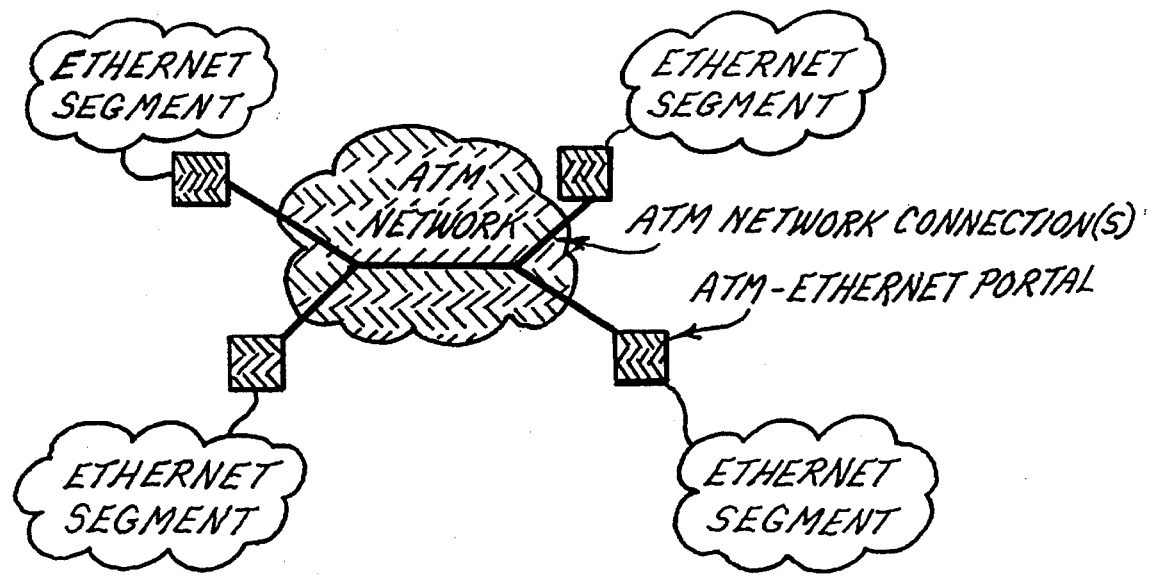
FIG. 1.
FIG. 2.
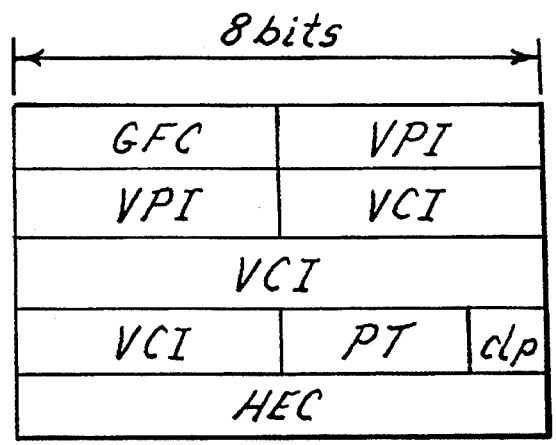
GFC - GENERIC FLOW CONTROL (4 bits)
VPI - VIRTUAL PATH INDENTIFIER (8 bits)
VCI - VIRTUAL CHANNEL INDENTIFIER (16 bits)
PT - PAYLOAD TYPE (3 bits)
cLp - CELL LOSS PRIORITY (1 bit)

ATM-ETHERNET PORTAL/CONCENTRATOR

BACKGROUND AND SUMMARY OF THE INVENTION

With the increasing need for the transfer of data over large distances, and the increasing use of Ethernet networks for local area networks (LANs), there has arisen a need for greater connectivity between LANs which provide greater data transfer rates and lower overhead, i.e. processing operations, for connecting LANs. In the prior art, devices known as bridges, routers, and gateways are available and well known for connecting LANs such as Ethernet segments over wide area networks (WANs). However, these prior art devices all have shortcomings. For example, bridges generally connect two Ethernet segments and are frequently limited to relatively short distances there between. While gateways and routers offer greater connectivity of Ethernet segments, these systems utilize network or transport level protocols to route data cells over LANs to their intended destination and must explicitly copy data cells destined for multiple destinations, as is required in broadcast application. Therefore, these prior art devices have limited usefulness and applicability.

In order to solve these and other problems in the prior art, the inventors herein have succeeded in designing and developing an ATM-Ethernet portal which conveniently connects disjoint Ethernet segments over an ATM/BISDN network (Asynchronous Transfer Mode/Broadband Integrated Services Digital Network), creating one large logical Ethernet segment. The portal of the present invention utilizes the ATM network transparently, with low overhead, and at speeds which exceed those of Ethernet segments such that operator usability and data transfer rates are non-limited. Each Ethernet frame transmitted on any one of the Ethernet segments is fragmented into a sequence of ATM cells, which are then transmitted by the local portal over the ATM network and delivered to the interconnected portals. When ATM cells are received at a portal, the cells are reassembled into Ethernet frames for transmission over their local Ethernet segments. The high level protocols used by the Ethernet hosts (that is, those protocols located above the data link layer in the ISO-OSI model) are not interpreted by the portal or by the ATM network. This contributes to the low overhead of the portal.

One of the significant advantages of the portal of the present invention is that it utilizes a dual port memory and a DMA transfer controller for moving either Ethernet or ATM data directly into this shared memory where header data is appropriately associated or disassociated therewith, and then out again to its destination under control of a microprocessor. With this hardware and methodology, the need to copy data cells is eliminated thereby dramatically decreasing the processing required by the portal and increasing the data throughput rate. As mentioned above, the rapid data throughput rate of the portal renders the ATM network connection transparent between Ethernet segments which may be separated by large distances. Of course this is a highly desirable feature and, in some applications, a requirement for the ATM network connection to be a useful interconnection scheme.

The hardware implementations of the present invention may be configured in either one of two contemplated arrangements as presently considered by the inventors herein. The first of these is a "standalone" implementation where all of the components are integrated on one or more custom design circuit boards to provide a custom portal device. Secondly, an "off the shelf" implementation may be utilized where the commonly available subsystems are comprised of purchased parts which are then integrated with a custom design ATM cell processor. This results in essentially a "PC" version which may be implemented through a commercially available PC with extra hardware added. The inventors have chosen the "off the shelf" strategy in implementing a prototype. However, for cost and size reduction, the "standalone" implementation would perhaps be more desirable in some applications.

With only minor modifications, the portal of the present invention may be extended to function as an ATM-Ethernet concentrator. As a concentrator, the device will multiplex a plurality of Ethernet controllers, each of which is associated with its own Ethernet segment, and provide connectivity between the plurality of Ethernet controllers and other Ethernet controllers/segments through an ATM network. Essentially, instead of a single Ethernet controller as is found in the portal, a common bus interconnects a plurality of Ethernet controllers to the concentrator which multiplexes their output and demultiplexes data being input. For larger concentrators for use with more Ethernet controllers, a wider bus and faster control microprocessor are utilized. The concentrator of the present invention, as with the portal, permits a transparent interconnection between local and remote Ethernet controllers/segments, and its operation is enhanced through the use of a dual port shared memory, DMA controller, and control microprocessor as is included in the portal design.

While the principal advantages and features of the present invention have been described above, a more complete and thorough understanding of the invention may be attained by referring to the drawings and description of the preferred embodiment which follow.

BRIEF DESCRIPTION OF THE DRAWINGS

FIG. 1 is a schematic diagram of an extended Ethernet segment utilizing the ATM-Ethernet portal;

FIG. 2 is a chart of an ATM user network interface (UNI) header format;

DETAILED DESCRIPTION OF THE PREFERRED EMBODIMENT

Figure 3:
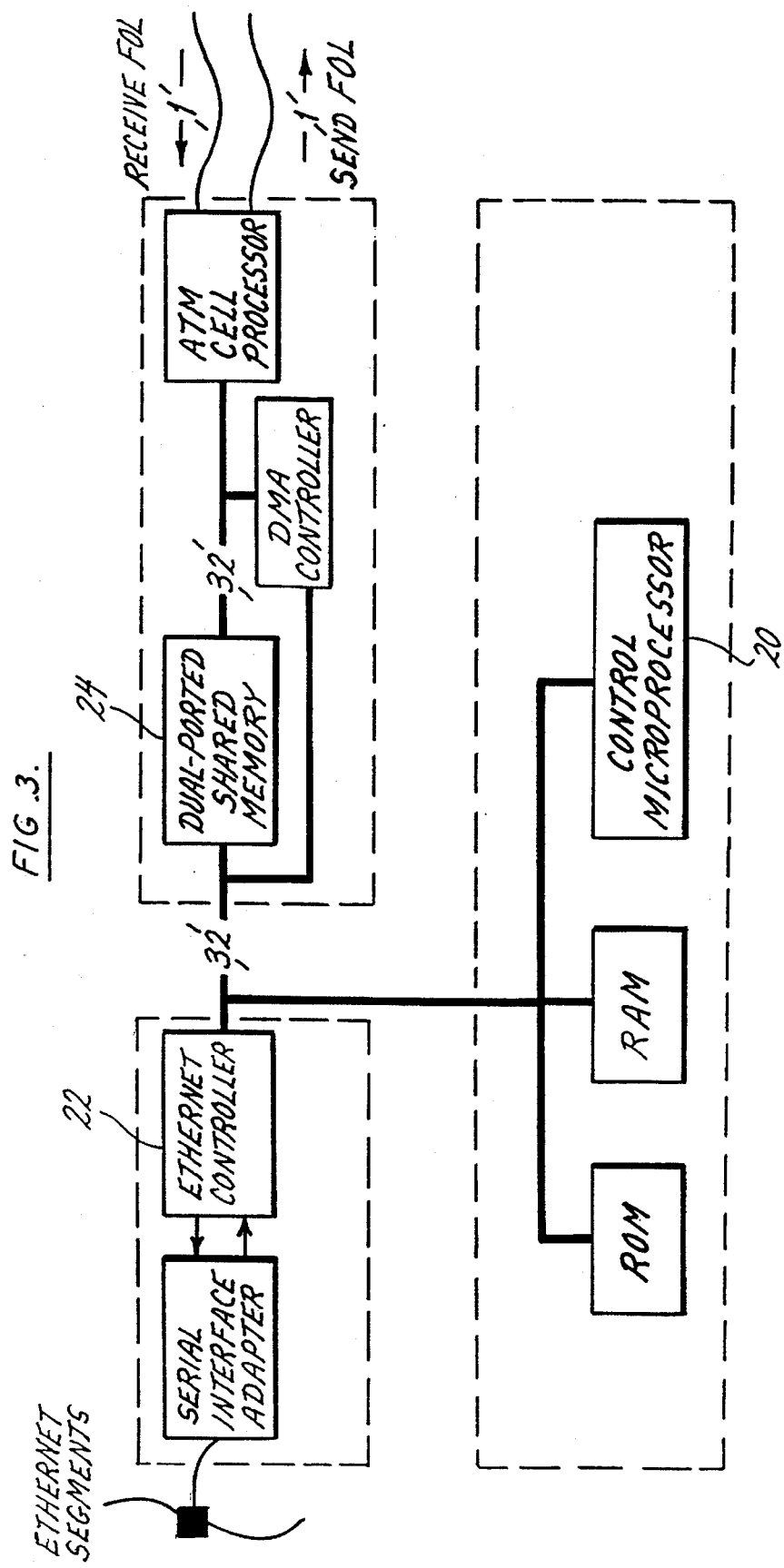
FIG. 3 is a schematic block diagram of the ATM Ethernet portal hardware architecture.

The ATM-Ethernet portal (portal) of the present invention connects disjoint Ethernet segments over an ATM/BISDN network (Asynchronous Transfer Mode/Broadband Integrated Services Digital Network), creating one large logical Ethernet segment, as shown in FIG. 1. Each Ethernet frame transmitted on any of the Ethernet segments is fragmented into a sequence of ATM cells, which are then transmitted by the local portal over the ATM network and delivered to the interconnected portals. When ATM cells are received, the portals reassemble the cells into Ethernet frames, then transmit the frames over their Ethernet segments. The high-level protocols used by the Ethernet hosts (that is, those protocols located above the data link layer in the ISO-OSI model) are not interpreted by the portal or by the ATM network.

A group of N portals can be interconnected over the ATM network via: 1) N·(N–1)/2 point-to-point connections, where each connection interconnects exactly two portals, 2) N one-to-many connections, where each connection links the transmitter of one portal to the receivers of the other N–1 portals, or 3) one many-to-many multipoint connection, where the single connection links the transmitters and receivers of all portals. Other interconnector topologies are possible as well, such as N-to-one. One network supporting all three types of connections, for which the prototype version of the portal was designed, is the experimental fast packet network designed by Turner.

By exploiting the properties of ATM networks, our portal offers the following two primary benefits over existing technologies: 1) relatively low overhead connectivity over Wide Area Networks (WANs), and 2) data stream replication by the network in hardware (when one-to-many or many-to-many ATM connections are used). Existing bridges, routers, and gateways connect Ethernet segments over WANs. However, bridges generally connect only two Ethernet segments and are frequently limited to relatively short distances, whereas portals can connect many segments separated by thousands of miles. Gateways and routers provide the connectivity of portals, but use network or transport level protocols to route cells over WANs to their intended destination and must explicitly copy cells destined for multiple destinations. With portals, hosts communicate using the data link level protocols of Ethernet, without higher level protocol processing required at intermediate hosts. This improves latency since no routing is required at these hosts. When one-to-many or many-to-many connections are used, the ATM network routes and copies cells internally, in hardware, at the data link layer. This method is considerably more efficient than that used by gateways and routers, where packets must be explicitly copied. Additionally, ATM networks are based on fiber optic technology with much higher speeds than the links used in conventional WANs.

The ATM protocol standard is currently under development by CCITT for communicating over Broadband Integrated Services Digital Networks (BISDNs). Clients of ATM networks communicate by creating connections to one another, then exchanging data over these connections. As mentioned above, ATM connections can be either: 1) point-to-point, 2) one-to-many, or 3) many-to-many. Since some ATM networks may not support all three connection types, the portal has been designed to work with all three. However, the software in our prototype has been implemented to use many-to-many connections since this type of connection is supported in the prototype ATM network and since it is considered that this type of connection is the best suited to the operation of the portal.

Using a many-to-many connection, several Ethernet segments are connected into one logical segment by creating a multipoint ATM connection and configuring each portal to be an endpoint of the connection. The ATM network connection can be set up by hand, via network management, or by signaling the network using a connection management protocol. When a connection management protocol is used, the protocol is not embedded in the portal. Rather, one (or more) hosts on the Ethernet contain the necessary software to do this in Connection Processors (CPs). The CPs send ATM signaling packets to the portal, which sends them, unaltered, into the ATM network. The signaling packets instruct the ATM network to establish the desired multipoint connection. The CPs must know the addresses (on the ATM network) of the portals participating in the connection. It is not specified how this information is obtained (it might, for example, be obtained through the ATM network via a routing service, or by network administrators exchanging information over the telephone). An endpoint is added to an existing multipoint ATM connection either by requesting to be added or by invitation from another endpoint. This means that one CP could configure the entire multipoint connection by first adding the portal on its local Ethernet segment, then adding other portals to this connection.

In addition to the interconnection pattern of connections (point-to-point, one-to-many, or many-to-many), the ATM standard also provides two routing mechanisms for connections: Virtual Path (VP) and Virtual Channel (VC). With a VP connection, clients set the VP identifier (VPI) field of the ATM header (FIG. 2) when sending cells. The network then uses the VPI for routing, possibly remapping this field at every switching node within the network, until the cells reach their destinations. With VC connections, clients set the VC identifier (VCI) and the VPI when sending cells and the network uses both the VCI and VPI for routing. For VP connections, the VCI is preserved by the network—whatever value the sending client places in this field is delivered to the destination client(s) and, therefore, is available for use by the client as a multiplexing field. With VC connections, the VPI is not necessarily preserved by the network and may have to be set to a particular value (such as zero). Therefore, VC connections do not allow the client to use the ATM header for multiplexing. The portal has been designed so that it can use both VP and VC connections. However, in the prototype ATM network, only VC connections are implemented. Therefore, the software in the prototype portal has been implemented to use only VC connections. As shown in FIGS. 13 to 17, a flow chart for the software is illustrated which may be used to implement the microprocessor of the present invention.

FIG. 3 shows the basic hardware elements used in the portal. The main components are a control microprocessor 20, an Ethernet controller 22, an ATM cell processor, a dual-ported shared memory 24, and a DMA controller 26. All components, except for portions of the ATM cell processor, can be implemented using off the shelf, commercially available VLSI circuits. A variety of choices are available for each component. For example, the Intel 80486 microprocessor could be used with the Intel 82596CA Ethernet controller. Alternatively, the Motorola 68030 microprocessor could be used with the AMD 7990 Lance Ethernet controller. The design only requires that the chosen components have certain basic capabilities common to a variety of readily available devices. Additionally, while FIG. 3 shows 32 bit busses (implying 32 bit components), 8 or 16 bit components could also be used, with a loss of performance likely under peak loads.

The architecture of FIG. 3 suggests two implementation options: 1) a "standalone" implementation, where all components are integrated on one or more custom designed circuit boards, or 2) an "off the shelf" implementation, where the commonly available subsystems of FIG. 3 (the control microprocessor and Ethernet controller blocks) are purchased and integrated with a custom designed ATM cell processor. The latter strategy has been chosen in the prototype to reduce the development time and aid in debugging. However, for cost and size reduction, the former strategy would perhaps be preferable.

When a frame is transmitted on the Ethernet, the Ethernet controller, operating in promiscuous mode, deposits the frame into shared memory. If no errors occur in frame reception, the Ethernet controller interrupts the control microprocessor. The microprocessor then initiates a DMA transfer, prompting the DMA controller to move the ATM cells (containing segments of the frame) from shared memory to the ATM cell processor. Because of the manner in which the incoming Ethernet frames are stored in shared memory (see FIG. 8), no copying of data is required using the no copy segmentation and reassembly algorithms described below. The ATM cell processor serially transmits the ATM cells on the outgoing fiber optic link. Going the other direction, when a cell arrives from the fiber optic link, the ATM cell processor prompts the DMA controller to initiate a DMA transfer, moving the cell from its internal buffer into shared memory. The microprocessor periodically examines the DMA control registers to see if new cells have arrived. If the microprocessor recognizes the arrival of new cells, it reassembles the incoming ATM cells into an Ethernet frame (once again, without copying). Once all cells of a frame have arrived, the microprocessor instructs the Ethernet controller to transmit the frame.

The microprocessor acts primarily as a high level buffer manager, while the Ethernet controller performs the low level data transfers to and from buffers. In other words, the microprocessor decides to where the controller should write incoming Ethernet frames and from where the controller should read outgoing frames.

Looking at the Ethernet-to-ATM path, the microprocessor initially partitions the shared memory into a collection of receive buffers so that incoming Ethernet frames will automatically be segmented into ATM cells. The microprocessor then formats and passes a list of receive buffer descriptors (which point to these buffers) to the controller. As frames are received, the controller places the data into buffers. After a frame has been received, the controller passes the buffers back to the microprocessor. The microprocessor then initiates a DMA transfer of the ATM cells to the cell processor. Once the transfer is complete, the microprocessor instructs the cell processor to transmit the cells, then recycles the receive buffers, passing them back to the controller.

Going the other direction, the microprocessor performs an analogous operation. As cells are received, the data is written into shared memory. The microprocessor analyzes the cells and figures out how they need to be arranged and reordered so that a complete Ethernet frame can be correctly reconstructed. The microprocessor then prepares a list of transmit buffer descriptors which point to the segments of the Ethernet frame. The transmit descriptors are ordered such that, when the controller retrieves and transmits the data, it will go out in the correct order. The microprocessor passes the buffers to the controller and instructs the controller to begin the transmission. Once the controller has completed transmitting the frame, it passes the buffers back to the microprocessor. At this point, the microprocessor recycles the transmit buffers so that they can be reused to store subsequent arriving ATM cells.

As stated above, many commercially available Ethernet controllers provide the necessary functionality. The particular capabilities that are required for the prototype implementation described in this document (that are not universally available) are the following.

A promiscuous mode, where all frames transmitted on the Ethernet are received by the controller.

Frame "scatter/gather", where incoming frames are automatically separated (scattered) into several noncontiguous buffers and outgoing frames are automatically assembled (gathered) from several noncontiguous buffers. These capabilities are used in the no copy segmentation and reassembly (SAR) algorithms.

Cyclic Redundancy Check (CRC) suppression on transmission and capture on reception. This capability is used to provide an end-to-end check on the Ethernet frame (from the originating Ethernet host to the destination Ethernet host). On Ethernet frame receipt, the CRC is captured and transmitted along with the rest of the frame over the ATM connection. When the ATM cells arrive at the destination portals, the original CRC is placed at the end of the frame and normal CRC generation is suppressed when the frame is transmitted onto the Ethernet. This causes the original CRC to be used by hosts that receive the Ethernet frame instead of a newly generated CRC.

The only one of these capabilities that is essential to the design is the promiscuous mode of operation. Without this capability, the portal would not be able to intercept all packets sent on a local Ethernet segment. Ethernet controllers without the other two capabilities could be used with a loss in performance. In particular, if frame scatter/gather is not provided, the no copy SAR algorithm would need to be replaced with an algorithm that does copy. If CRC suppression and capture is not provided, an end-to-end check at the data link level is not possible, but CRCs could be inserted on each ATM cell or on segmented Ethernet frames to detect errors that occur within the ATM network.

The design uses a dual-port memory (FIG. 3) to reduce bus contention and thereby improve performance. Shared memory arbitration prevents the simultaneous access of more than one component to the same memory location, while allowing simultaneous access to different memory locations. With this memory, the Ethernet controller can write an incoming frame or read an outgoing frame, or the microprocessor can access data, concurrent with DMA transfers to and from the ATM cell processor. Since these operations occur on different busses, they do not interfere with one another. The design does not preclude use of a single-port memory in place of the dual-port memory. However, degraded performance may result under peak loads (due to bus contention) if such a component is chosen.

Figure 4:
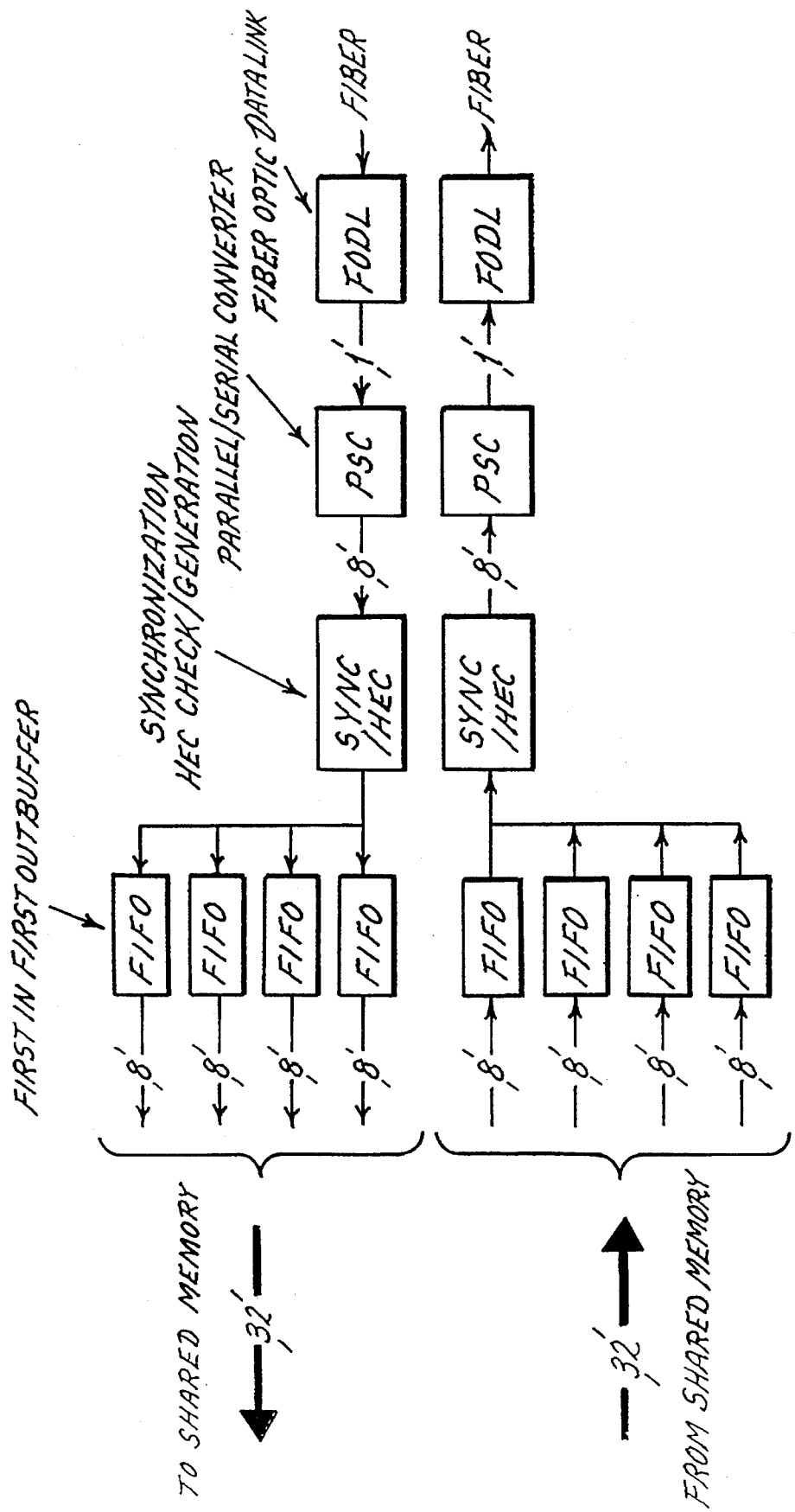
FIG. 4 is a block diagram of the ATM cell processor architecture.

A block diagram of the ATM cell processor is shown in FIG. 4. At the top right, cells arrive from the fiber optic link and enter a fiber optic data link (FODL) device, which converts the light signal into an electrical signal. Next, the serial signal enters a Parallel/Serial Converter (PSC), where the serial signal is converted into an 8 bit wide signal. The 8 bit values are transferred to a Header Error Check (HEC) check circuit. If the HEC indicates an error, the cell is discarded. Next, the external fiber optic link rate is synchronized to the internal clock rate, then the bytes of the cell are transferred into the top four First In First Out buffers (FIFOs) in round-robin fashion, from top to bottom. Once each of the FIFOs has one byte, a Direct Memory Access (DMA) transfer request is issued, causing the DMA controller (FIG. 3) to move the 32 bit word into shared memory. Subsequent bytes of the incoming cell are transferred into the FIFOs and to shared memory in the same fashion. Several commercially available, FODL, PSC, and FIFO components provide the required functionality. For example, the AT&T 1352C FODL receiver, the AMD Am7969 Transparent Asynchronous Xmitter/Receiver Interface (TAXI) receiver, and the IDT 7202A FIFO could be used for these functions.

Going the other direction, after the Ethernet controller has received a frame into shared memory, the microprocessor issues a DMA request so that the cells of the frame are transferred to the bottom set of FIFOs. After the transfer is complete, the ATM cell processor is signaled so that it knows to begin emptying the FIFOs. The cells are transferred to the (bottom) PSC (with HEC inserted), synchronized to the external fiber optic link rate, serialized, then passed to the FODL and transmitted on the fiber optic link. Complementary parts to those mentioned above provide the required functionality. For example, the AT&T 1252C FODL transmitter and the AMD Am7968 TAXI transmitter could be used.

When the portal receives a frame from the Ethernet, it breaks the frame into a number of segments, embeds each segment in an ATM cell, and transmits the ATM cells over the multipoint connection to all other portals. When the remote portals receive the segments, they reassemble them back into an Ethernet frame, then transmit the frame on their local Ethernet segments. In order to facilitate reassembly, a segmentation and reassembly (SAR) protocol is used, wherein each ATM cell contains a segment header that indicates how the segment is to be reassembled. The requirements for the SAR protocol vary depending on the type of connection used (point-to-point, one-to-many, or many-to-many) and depending on whether VP or VC connections are used. For the prototype portal, it was assumed that the network supports many-to-many VC connections. Additionally, it was assumed that sequenced delivery of ATM cells is not guaranteed by the network. The resulting SAR protocol is based on these assumptions and is most general in that it will also work with all other types of connections. However, alternative strategies, which are described elsewhere, can make more efficient use of network resources by using fewer bytes of the ATM payload field for the SAR header.

Figure 5:
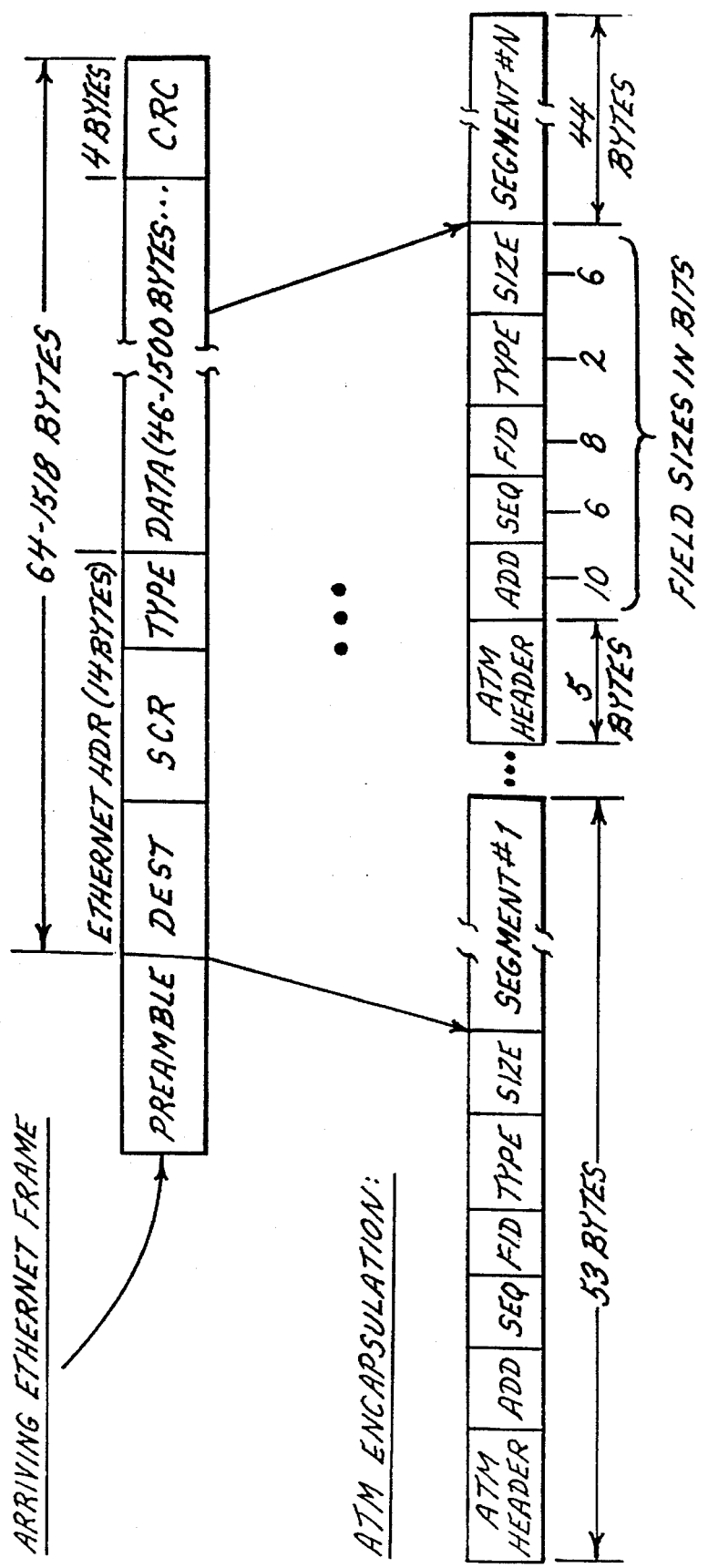
FIG. 5 is a block diagram of an Ethernet frame segmentation into ATM cells.
Figure 6:
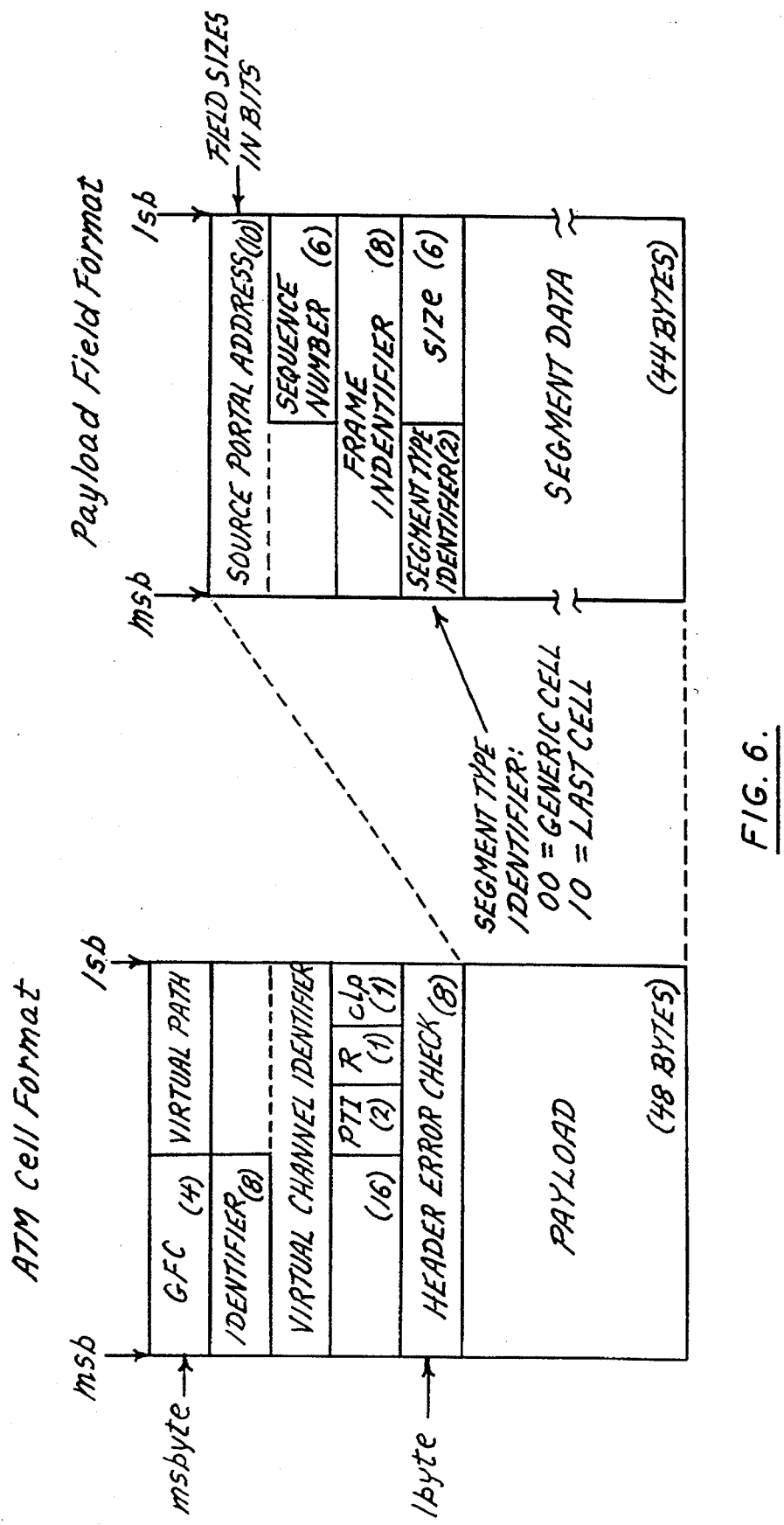
FIG. 6 is a block diagram demonstrating the segmentation and reassembly (SAR) header.

FIG. 5 shows the segmentation procedure. FIG. 6 shows the detailed format of the ATM cell, with the formatting of the ATM payload field for segments placed in this field. The source portal address identifies the portal from which the frame originated. This address can be set by the connection processor during initialization, read from a DIP switch register located on the portal board, or set dynamically. The sequence number is a six bit field that identifies the segments location within the Ethernet frame. The frame identifier (FID) is an eight bit field that distinguishes between different Ethernet frames sent by the same portal. The segment type identifier (STI) is a two bit field, where the high order bit (when set) indicates that the cell is the last segment of the Ethernet frame and the low order bit is reserved (not currently interpreted). The size is a six bit field that indicates the number of meaningful bytes in the segment data field (for all segments but the last, the size must be 44). The sequence number field and the size field of the last segment are sufficient to generate the exact length of the Ethernet frame. The length is given by:

$$\text{length}=(\text{sequence number}-1)\times44+\text{size}$$

As mentioned earlier, the protocol assumes that all ATM cells are sent over a preconfigured multipoint connection, where each cell is delivered to all other portals. When the multipoint connection is first created, a Virtual Path Identifier (VPI) and Virtual Channel Identifier (VCI) are assigned to the connection. The portal fills in these fields in the ATM header for all cells sent. The Payload Type (PT) field is set to zero, indicating a data transmission, the Cell Loss Priority (CLP) is set to 0 (for high priority), and the Header Error Check (HEC) is generated by the hardware.

Figure 7:
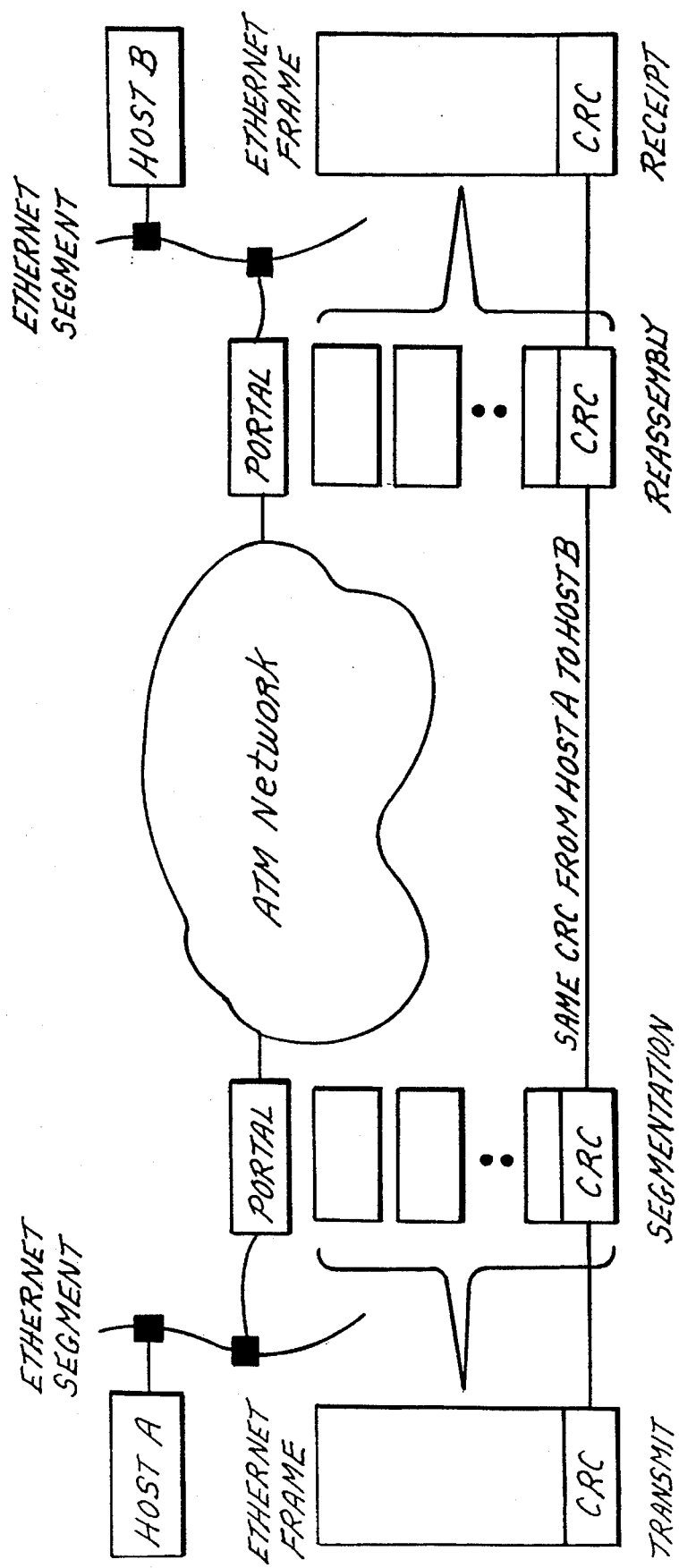
FIG. 7 is a block diagram illustrating the end-to-end CRC propagation.

The portal does not explicitly check for ATM payload field errors when transmitting over the ATM network. Rather, the Ethernet CRC is used as an end-to-end check, as shown in FIG. 7. This CRC is included in the data sent over the ATM connection. When a portal retransmits the frame on its local Ethernet segment, CRC generation is suppressed and the original CRC is used instead. Hence, the CRC generated at the source host on the source Ethernet segment is received by all destination hosts on the destination Ethernet segments.

Given that Ethernet frames range in size from 64 bytes to 1518 bytes, the minimum number of segments per frame is 2 and the maximum is 35. The overhead from the ATM header and the payload header/trailer increase the amount of data transmitted from between 1.20 to 1.79 times the size of the Ethernet frame. Therefore, a peak fiber link bandwidth allocation of 20 megabits (twice the speed of Ethernet) is sufficient to keep up with a fully loaded Ethernet. A higher peak bandwidth could be used to accommodate short bursts of higher than 20 megabits when several portals transmit concurrently at maximum capacity.

The eight bit frame identifier field restricts the maximum number of frames that can be reassembled at a given time from a given portal to 256. For long distance high speed links, many more frames than this may be in transit at a given time. However, the spacing between the cells is large enough that it is unlikely that a cell will be delayed (with respect to other cells) to the point where it will be associated with an incorrect frame during reassembly. Even if this does occur, the end-to-end CRC check performed by the Ethernet will, with very high probability, discard the incorrectly reassembled frame.

Software runs on the microprocessor (FIG. 3) and provides the portal functionality. The software's main task is the segmentation and reassembly of Ethernet frames to and from ATM cells. A "brute force" solution to this problem would be to receive the Ethernet frame into a buffer, copy the data from the buffer into ATM cells (filling in the cell headers), then transmitting the cells over the fiber optic link. On ATM cell reception, the brute force solution would be the inverse, copying the data from the ATM cells into an Ethernet transmit buffer, then transmitting the frame on the local Ethernet. However, this data copy burdens the microprocessor and the system bus, potentially reducing the maximum load that the portal can handle to less than the capacity of the Ethernet. Therefore, no copy segmentation and reassembly algorithms have been developed, which utilize capabilities of the Ethernet controller to eliminate the copy overhead.

Figure 8:
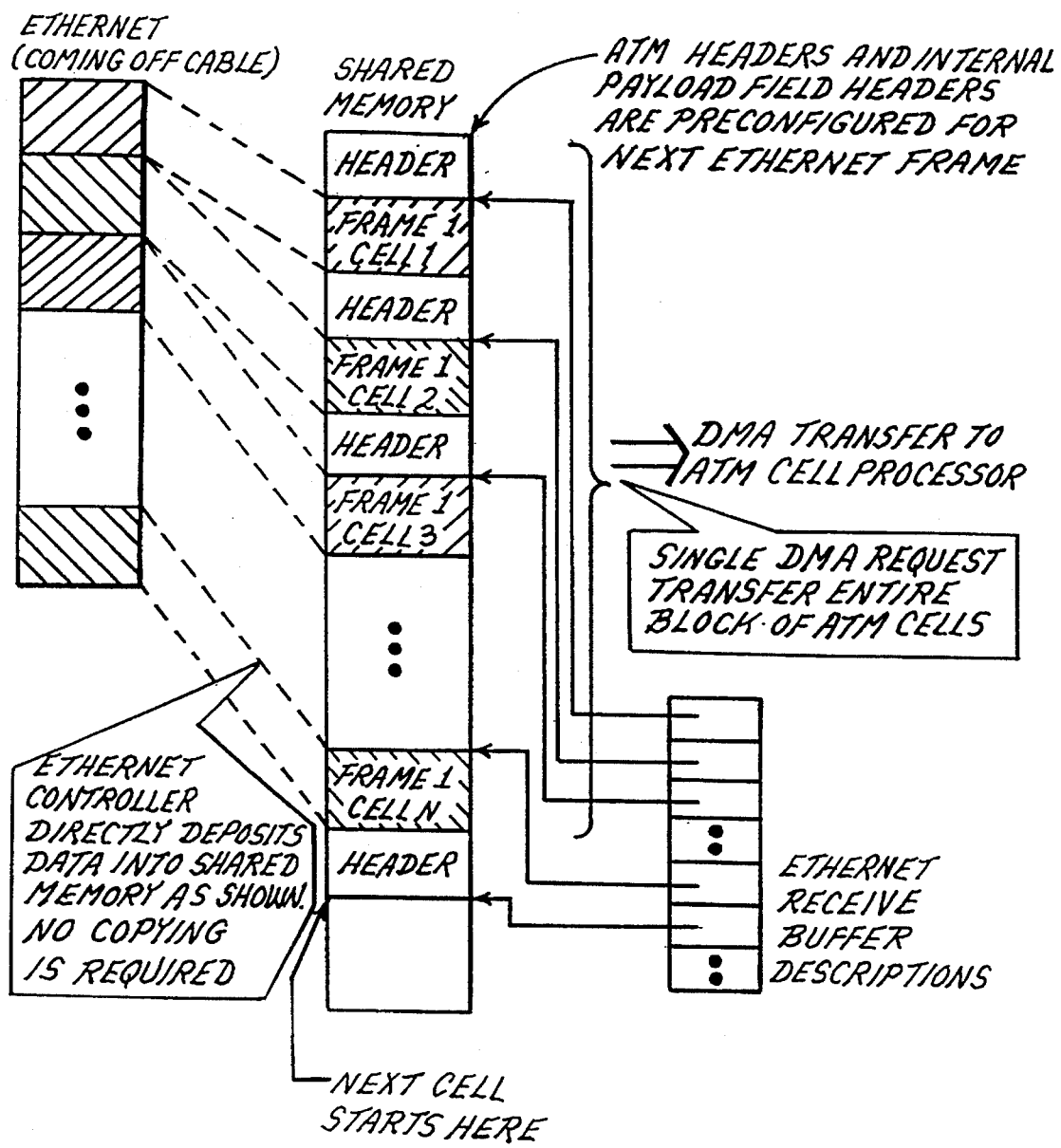
FIG. 8 is a block diagramming illustrating the processing of incoming Ethernet frames.

FIG. 8 shows how frames arriving from the Ethernet are loaded into shared memory and transferred to the ATM cell processor. When the Ethernet controller receives a frame, it examines a list of Ethernet receive buffer descriptors to determine where in memory to place the arriving frame. These descriptors are set so that the frame is placed in shared memory. Additionally, since a frame does not have to be stored contiguously in memory, the descriptors are set so that the frame is automatically fragmented into 44 byte segments, as shown in FIG. 8. The "holes" between each 44 byte segment are configured to be the same size as that needed for the ATM cell header and the internal SAR header (plus 11 bytes of intercell padding, so that each cell starts on a 64 byte boundary). Thus, the result is a contiguous collection of ATM cells (with inter-cell padding) containing the segmented data of the Ethernet frame. Once Ethernet frame reception is complete, the ATM and internal SAR headers are set appropriately so that the frame can be reassembled upon reception. This involves setting the VPI, VCI, and PTI fields of the ATM header, and setting the source portal address, frame identifier, sequence number, segment type identifier, and size fields of the internal payload header.

As a performance optimization, since many of these header fields never change, they are set once during portal initialization, then never altered again. All of the ATM header fields and the source portal address field can be preset. The remaining fields must be set for each cell. However, as a second optimization, if the microprocessor is idle, it presets these fields based on the values used in the previous frame. For example, the frame identifier can be set to one plus the frame identifier used in the last frame, the sequence numbers can be set from 0 through 34 (the maximum frame size), and the size fields can all be set to 44. Then, after the next frame is received, only the segment type identifier and size fields of the last ATM cell need to be updated to reflect the actual size of the Ethernet frame before the cells can be sent.

Since the Ethernet frame has been segmented into a contiguous sequence of ATM cells, the entire block of ATM cells is transferred to the ATM cell processor with one DMA request (the 11-byte inter-cell padding, mentioned above, is automatically stripped off by the ATM cell processor). This improves performance by reducing the load on the microprocessor since the DMA control registers only need to be set up once per Ethernet frame and only one interrupt must be serviced by the microprocessor—when the DMA transfer completes.

Cells arriving from the fiber optic link are reassembled into Ethernet frames by the portal then transmitted over the local Ethernet segment using the no copy reassembly algorithm. First, incoming ATM cells are processed in the simple case as described, where cells arrive in sequence from the fiber optic link, with no intermixing from different portals and no cell loss. Next, the generalized case is described where unsequenced arrivals, cell intermixing, and cell loss are all possible. Finally, the memory management algorithm is described for reclaiming memory used by cells whose frames cannot be reassembled (due to cell loss).

Figure 9:
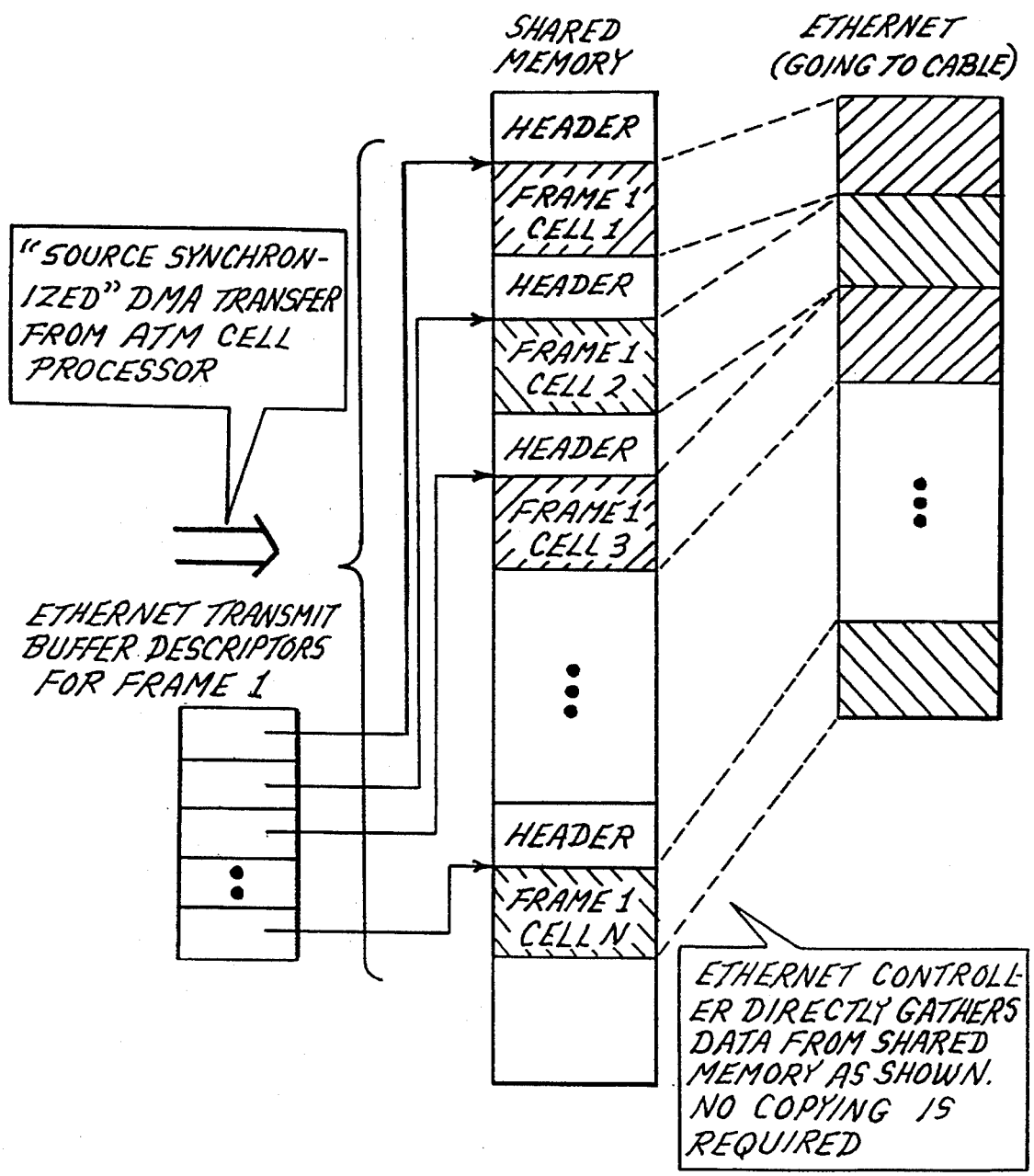
FIG. 9 is a block diagram illustrating the processing of incoming ATM cells wherein cells arrive contiguously with no lost cells.

FIG. 9 shows how ATM cells are transferred from the ATM cell processor into shared memory, reassembled, then transmitted onto the Ethernet. This figure assumes that cells arrive in order, without cell intermixing from different portals, and that no cells are lost. A DMA transfer moves the cells from the ATM cell processor to shared memory. The DMA controller is operated in the "source synchronized" mode, where a transfer is initiated whenever a cell arrives, without intervention from the microprocessor. This requires that the microprocessor set up control registers within the DMA controller in advance, but does not require per cell intervention by the microprocessor.

The microprocessor periodically examines the DMA control registers to determine how many ATM cells have been transferred into shared memory. If new cells have arrived since the microprocessor last checked, these new cells are processed. For each cell, the microprocessor examines the source address and frame identifier to determine whether the frame corresponding to the cell is currently being reassembled. If not, a new reassembly record is created to keep track of the frame. Otherwise, the existing reassembly record for this frame is used. The reassembly record maintains pointers to the cells received thus far for this frame (on an Ethernet transmit buffer descriptor list) and two counters: the first, frame_size, records the total number of ATM cells in the frame and the second, cells_received, records the number of cells received thus far for the frame. The frame_size counter is initialized to a number larger than 35 (the maximum number of segments for a frame), then set to the actual number of segments in this frame when the last cell of this frame is received. The cells_received counter is incremented for each frame. When the cells_received counter equals the frame_size counter, all segments have been received and the Ethernet frame is transmitted.

Once the ATM cells of an entire Ethernet frame arrive, the microprocessor passes the transmit buffer descriptor list stored in the reassembly record to the Ethernet controller. The Ethernet controller automatically assembles the frame from the noncontiguous locations of the segments, then transmits the frame onto the Ethernet (as shown in FIG. 9). As an optimization, since buffers pointed to by the transmit buffer descriptors never change in location or size, these fields of the descriptors are initialized after a reset or power up and are not modified again. Only linked list manipulation is required on the descriptors.

Figure 10:
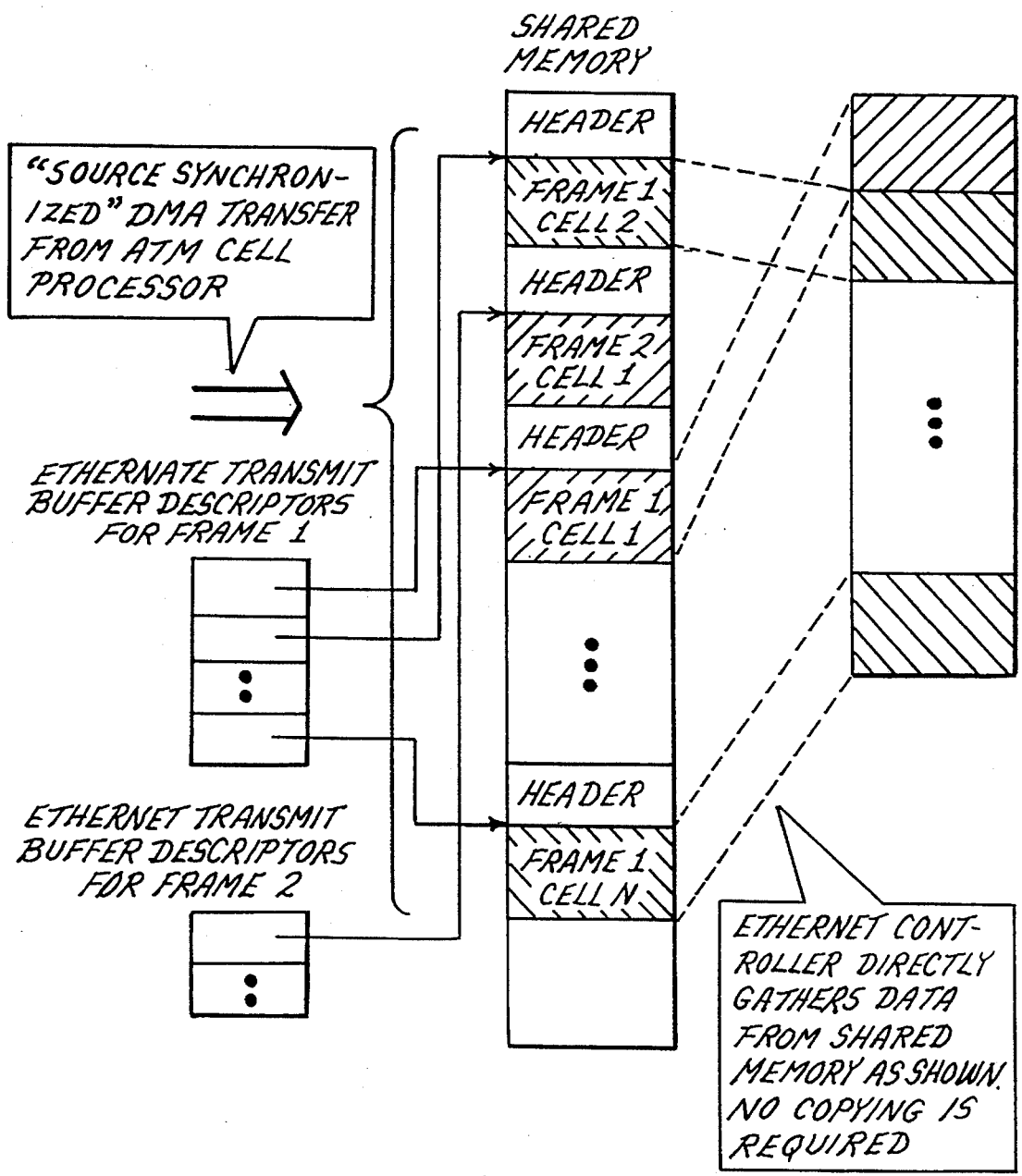
FIG. 10 is a block diagram illustrating the processing of incoming ATM cells in the general case requiring reordering and multiple frame assembly.

In general: 1) cells do not arrive in order, 2) cells from several different frames get intermixed, and 3) cells get lost. However, the Ethernet controller allows the same strategy as that described above to be used, with minor modifications. FIG. 10 depicts the operation in the general case. When assembling multiple frames at the same time, several reassembly records will be active at the same time, one for each Ethernet frame for which a corresponding ATM cell has been received. When a new cell is processed, the appropriate reassembly record is obtained, the new cell is placed on the transmit buffer descriptor list, and the frame_size and cells_received counters are updated. To handle lost cells, the memory used by the frame is simply reclaimed, as described below.

ATM cells are transferred into shared memory using DMA transfers as they arrive from the fiber optic link. A block of memory is reserved in shared memory for incoming cells. The DMA controller is initialized to begin transferring data into the first address of this block, continue writing data until the end of the block is reached, then automatically wrap around and resume writing at the first address. Three pointers into this block are maintained to constrain access to the block: 1) the writer pointer (WP), read and written by the DMA controller and read only by the microprocessor, which points to the shared memory location to store the next cell, 2) the read pointer (RP), read and written only by the microprocessor, which points to the location of the next cell to be read by the microprocessor, and 3) the stop pointer (SP), read by the DMA controller and written by the microprocessor, which points to the location of the first in use cell (no longer available for storage of incoming cells). At initialization, all three pointers point to the beginning of memory. When advancing the pointers, all are advanced modulo the size of the shared memory.

The DMA controller looks only at the WP and SP, advancing the WP unit it equals one minus SP. At this point, reception of incoming cells is suspended (and new cells discarded) since there is no room left to store them. The microprocessor compares the RP with the WP to determine whether new, unprocessed cells have arrived. As new cells are processed, the RP is advanced by the microprocessor until it equals the WP. Processed cells whose entire Ethernet frames have not yet been received are stored in shared memory until the frame can be transmitted. Once a frame is transmitted, the cells are recycled, wherein the microprocessor advances the SP over the freed cells.

If an ATM cell is lost, the SP will not be incremented beyond the location of any other cell in the same Ethernet frame since this frame is only transmitted after all component cells have been received. Therefore, to reclaim these orphaned memory locations, partially reassembled Ethernet frames are forcibly discarded when the WP gets "too close" to the SP. When this occurs, the microprocessor advances the SP to some threshold beyond the WP, discarding the intervening Ethernet frames while recycling the freed cells.

Figure 11:
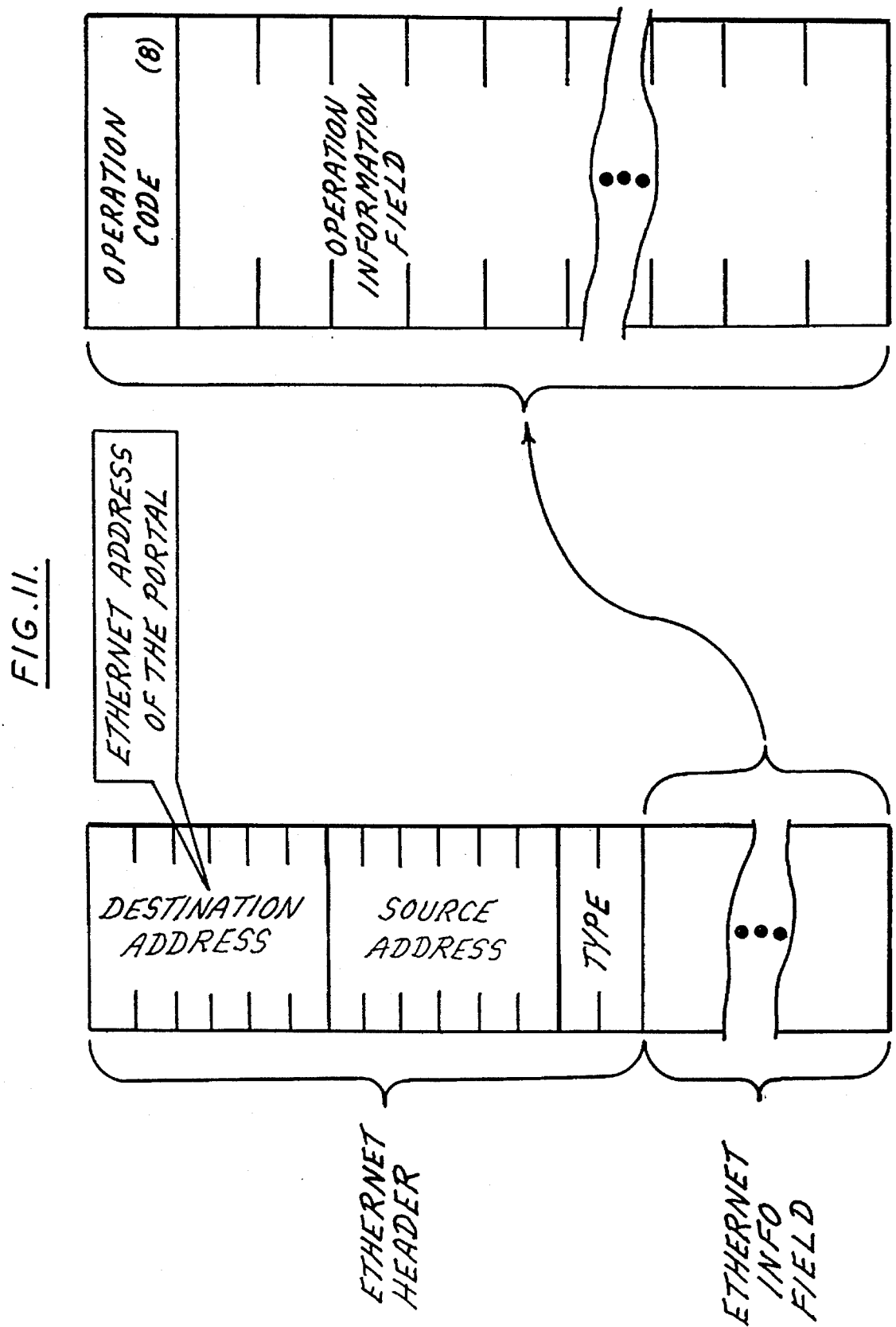
FIG. 11 is a block diagram illustrating the format of control cells addressed to the portal.

It has been mentioned that the ATM network connection or connections used by the portal can either be established by hand (using network management) or by signaling the network using its connection management protocol. If use of a connection management protocol is required or desired, a Connection Processor (CP) runs on one of the hosts connected to an Ethernet segment. To create and modify a connection, the CP sends ATM control cells into the ATM network. These cells contain connection management requests and are formatted in a manner appropriate for the ATM network being used. The CP uses the portal to send control cells into the ATM network by addressing an Ethernet frame containing control cells to the portal. When the portal receives an Ethernet frame addressed to itself, it does not transmit the frame over the ATM network as described earlier. Rather, it interprets the frame as a control frame with the format shown in FIG. 11. When the operation field indicates a transmit ATM control cells command, the operation information field contains one or more fully formatted ATM control cells. The portal then transfers these cells onto the fiber optic link without modification. Since incoming frames are broken into blocks when received, the ATM control cells are not contiguously located within shared memory and are reassembled by issuing separate DMA transfer requests for each block.

Other control operations give the CP the ability to: set the Virtual Path Identifier (VPI) and Virtual Channel Identifier (VCI) used by the portal, set the source portal address, set the buffer sizes for receive and transmit buffers, suspend/resume processing of frames, reset the portal, and perform a variety of diagnostics functions.

To reduce the number of Ethernet frames flowing over the ATM multipoint connection, the portal filters incoming frames whose destination addresses are known to be on the local segment. Whenever an Ethernet frame arrives from the local segment, the portal examines the destination address to see if it is in a list of addresses known to be on the local segment. The addresses in this list are either loaded by the CP (in unsophisticated portals) or "learned" by the portal. The portal learns new addresses by examining the source address of each frame received from the local segment and placing this address in the list of known addresses (if it is not already present). Filtering has two advantages: 1) the number of frames on each local segment is reduced since only intersegment frames are ever transmitted to all segments, and 2) the aggregate load of all segments can exceed the capacity of any one Ethernet segment since no one segment ever receives all Ethernet frames.

When point-to-point ATM network connections are used to interconnect portals, several connections terminate at each portal, one for each remote portal. Each connection is distinguished by a unique VPI/VCI pair in the ATM cell header. When an Ethernet frame is received from the local Ethernet segment, the portal can either send a segmented copy of the frame to all other portals (so that all remote portals receive a copy of the frame, as when a single copy is sent over a one-to-many or many-to-many connection). Or, the portal can route the frame to the portal to which the destination Ethernet host is connected. Routing reduces portal overhead since only a single cell stream must be sent. As with filtering, the routing information can either be loaded into the portal by the CP, or it can be learned. Pairings of <destination host, portal> can be learned by examining the source address of each reassembled Ethernet frame, then recording the ATM connection identifiers (VPI/VCI) over which the frame arrived. When subsequent frames are received from the local segment headed for this destination, they are sent out the corresponding connection. If no <destination host, portal> pairing is known for a frame, or if the frame is an Ethernet multicast or broadcast frame, it is sent out each link to all other portals.

Figure 12:
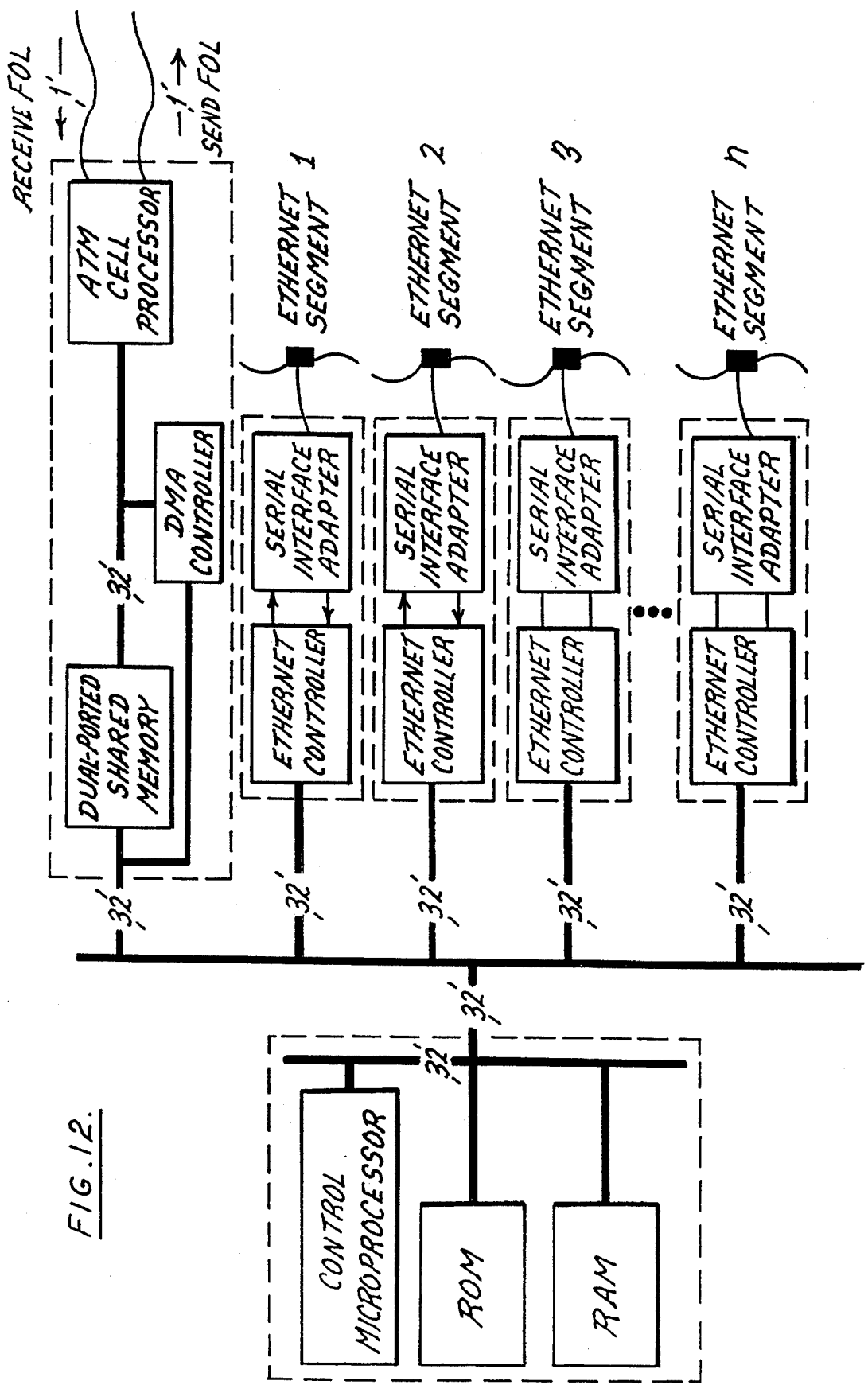
FIG. 12 is a block diagram of an ATM-Ethernet concentrator utilizing components from the portal invention.
Figure 13:
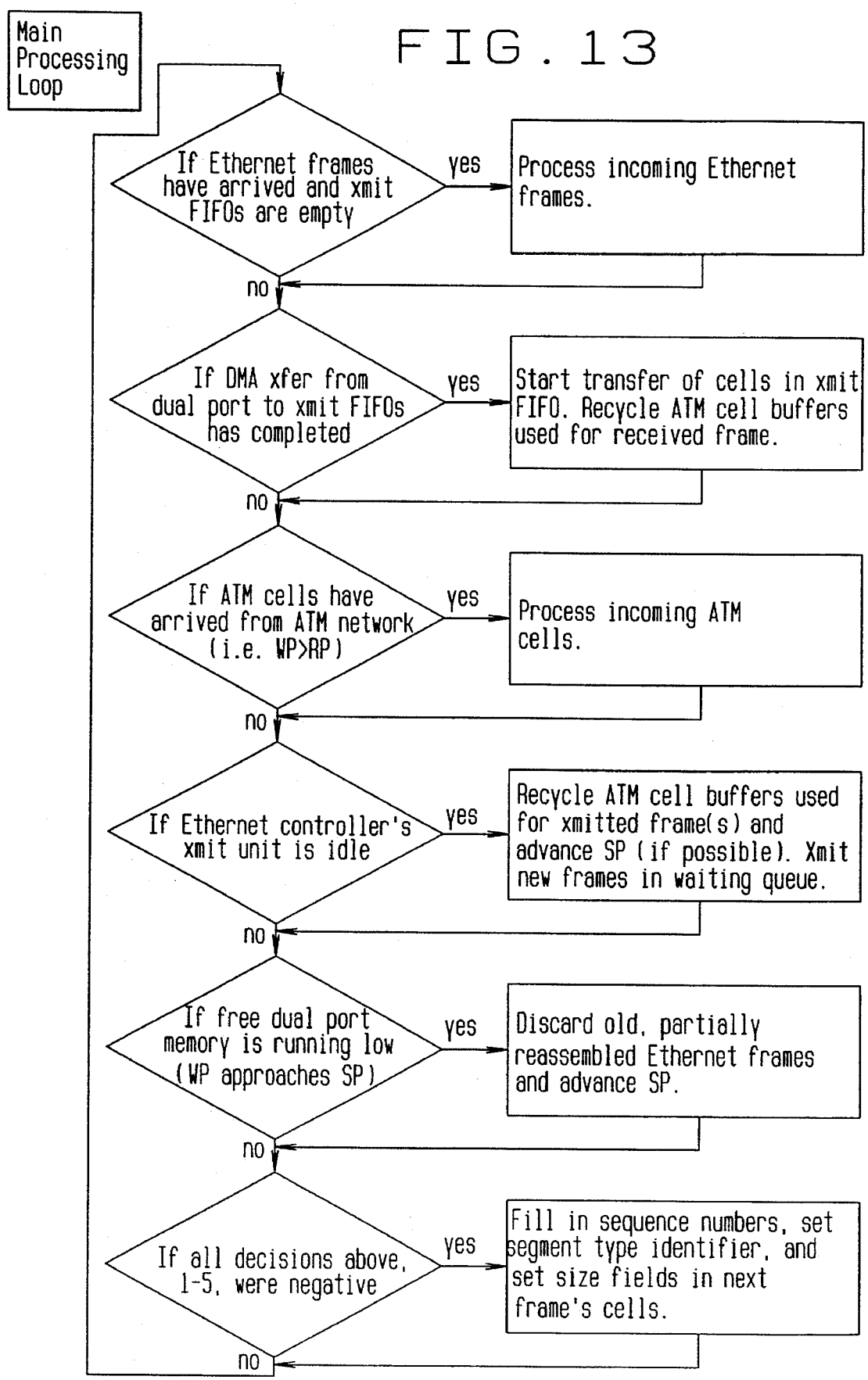
FIG. 13 is a flow chart illustrating the main processing loop.
Figure 14:
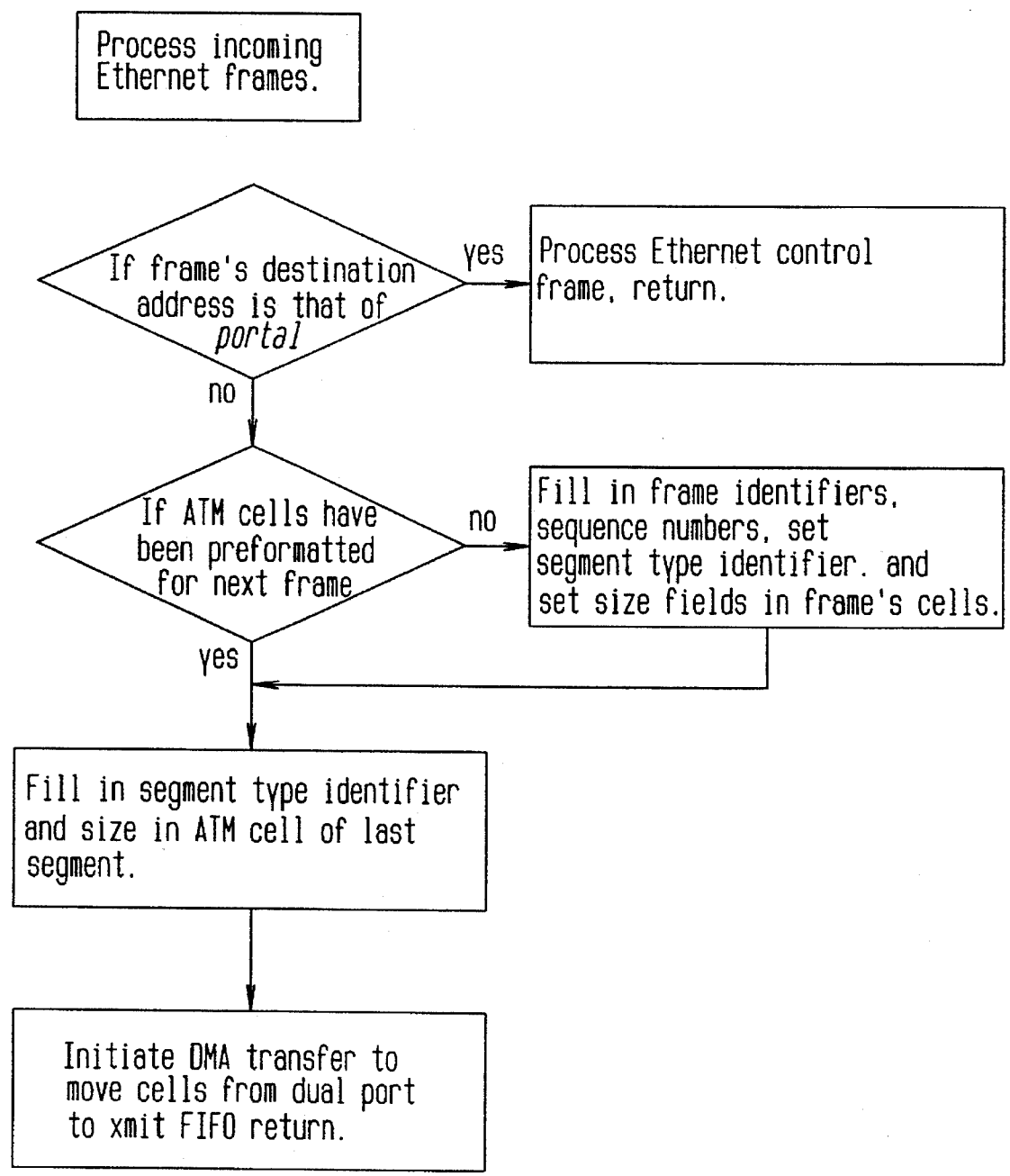
FIG. 14 is a flow chart illustrating the process for incoming Ethernet frames.
Figure 15:
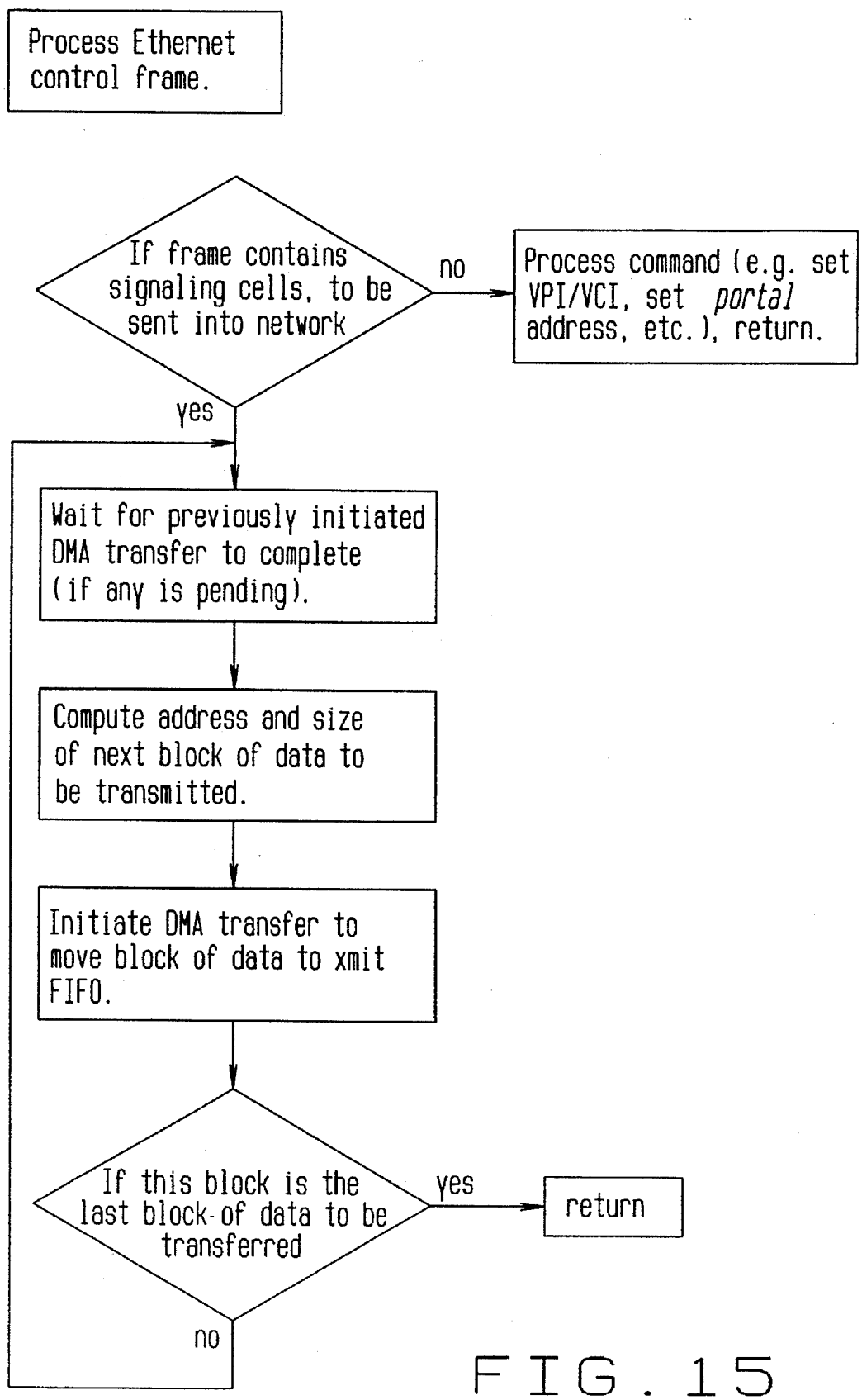
FIG. 15 is a flow chart illustrating the processing of Ethernet control frames.
Figure 16:
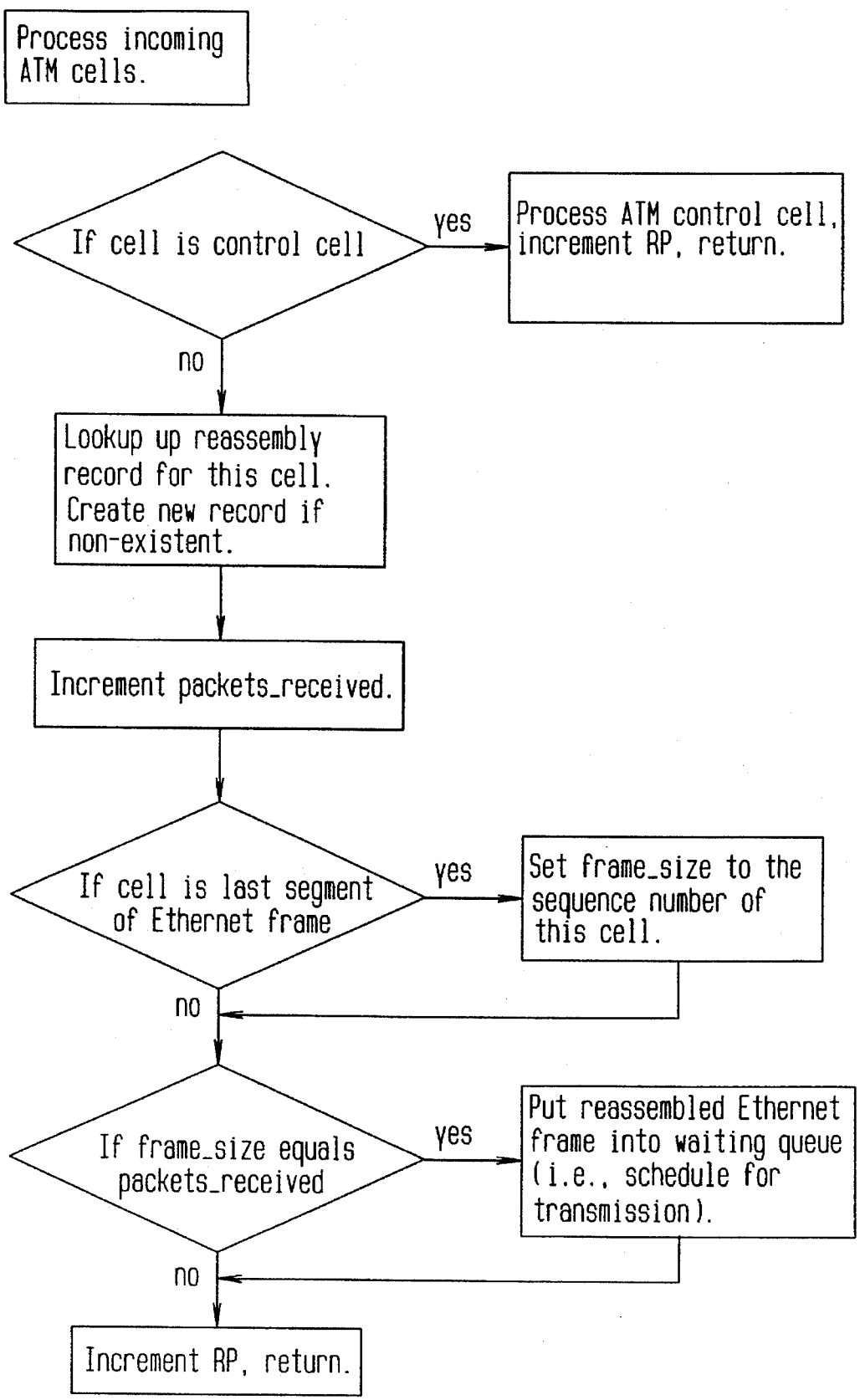
FIG. 16 is a flow chart illustrating the processing of incoming ATM cells.
Figure 17:
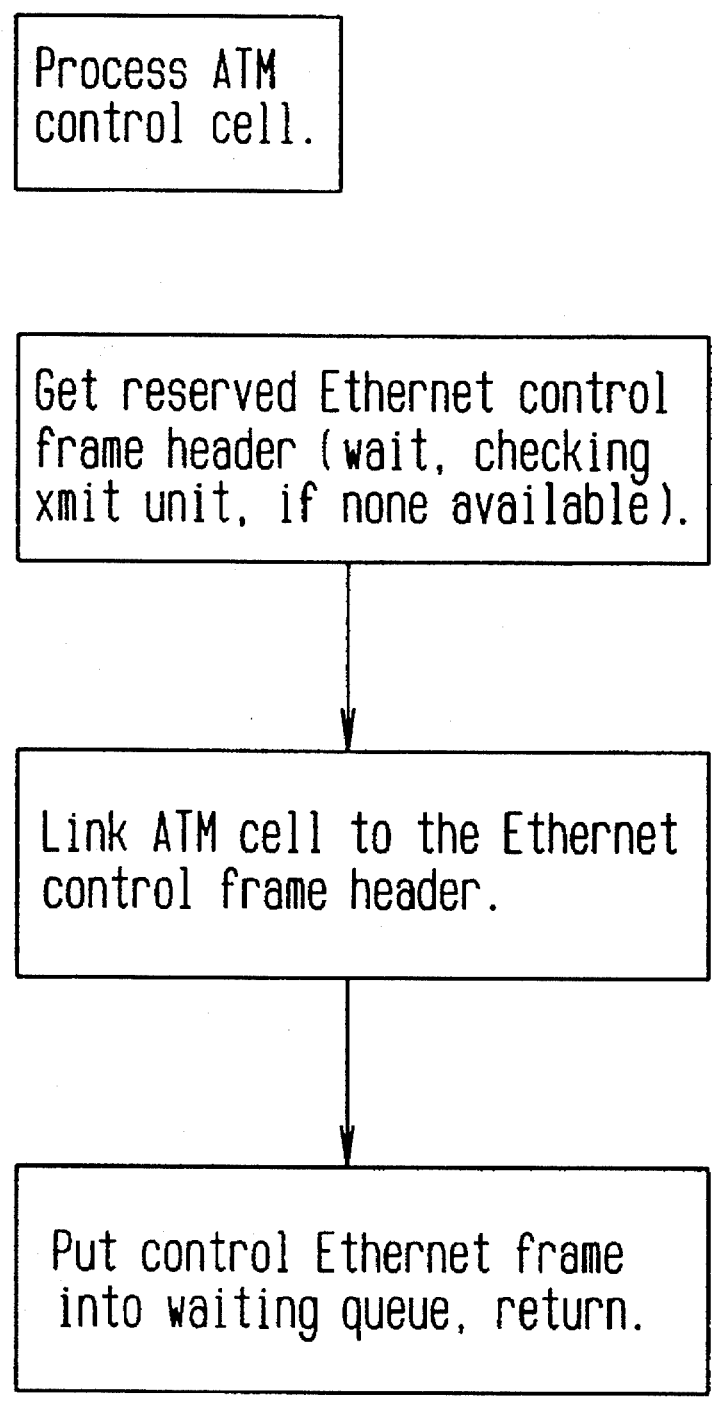
FIG. 17 is a flow chart illustrating the processing of ATM control cells.

With minor modifications, the portal can be extended to function as an ATM-Ethernet concentrator, a device that multiplexes many Ethernet controllers and subnetworks onto one ATM link and that transfers Ethernet frames between the directly connected controllers and subnetworks. FIG. 12 shows the architecture of a concentrator constructed from the portal components. The components remain the same: a control microprocessor subsystem (with microprocessor, ROM and RAM), an ATM cell processor subsystem (with dual-port shared memory, a DMA controller and ATM cell processor), and multiple Ethernet interface subsystems (each with serial interface adapter and Ethernet controller). In fact, these components can be identical to those used in the portal, with only modifications to the software required.

While some aspects of the software used in the concentrator must be modified from that used in the portal, it is possible to use the same SAR protocol and the same no copy segmentation/reassembly algorithms. However, with multiple Ethernet segments, additional filtering and routing intelligence is required so that frames received from the ATM network are only transmitted on the required Ethernet segment(s), and so that frames received from one of the directly connected segments and destined for another directly connected segment are only transmitted to this segment and not over the ATM network connection.

Although it is possible to construct a concentrator with identical hardware components to those used in the portal, the number of Ethernet segments that can be supported is limited by the bus bandwidth and microprocessor speed. Consequently, for large concentrators, the bus bandwidth and microprocessor speeds must be increased, and the Ethernet controller and ATM cell processor subsystems scaled to interface with the faster bus. As with the portal, two implementation options are possible: 1) a standalone implementation, using all custom designed components, or 2) an off the shelf implementation, where the commonly available blocks of FIG. 12 are integrated with a custom designed ATM cell processor.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A portal for interconnection between an Ethernet segment and an ATM network, each of said Ethernet segment and ATM network having means for transmitting data in a particularized format, said Ethernet data format being different than said ATM data format, said portal having a shared memory means for storing said data received from either of said Ethernet segment or said ATM network, said shared memory means comprising a dual port memory, means for converting data received in either of said formats to the other of said formats to thereby permit the free flow of data between said Ethernet segment and said ATM network, the data conversion means having means for converting the original data received from either the Ethernet segment in Ethernet format or ATM network in ATM format to the other of said formats without Copying of said original data, and re-transmitting said re-formatted original data after conversion of its format, and means for generating and storing formatting data into said dual port memory so that as said data is stored in said dual port memory it becomes associated with appropriate formatting data to thereby achieve its format conversion, an Ethernet controller connected between said Ethernet segment and a first port of said dual port memory, an ATM cell processor connected between said ATM network and a second port of said dual port memory, and a DMA controller connected between each of said Ethernet controller and ATM cell processor and said dual port memory for transferring data therebetween.

2. The portal of claim 1 wherein said data conversion means further comprises a microprocessor connected to said DMA controller for controlling the transfer of data by said DMA controller from said dual port memory.

3. The portal of claim 2 wherein said microprocessor has means for partitioning said dual port memory into a plurality of receive buffers, each of said buffers having an associated formatting data of ATM format, said Ethernet controller has means for storing a frame of incoming Ethernet formatted data into said receive buffers to thereby effectively re-format said Ethernet data into ATM data, and said DMA controller has means for transferring the contents of said receive buffer to said ATM cell processor for transmission of said re-formatted data over said ATM network.

4. The portal of claim 3 wherein said ATM cell processor has means for transferring ATM incoming data into said receive buffers, said microprocessor has means for determining the order of said ATM data, and means for transferring said order to said Ethernet controller for assembling a frame of Ethernet formatted data from said ATM data.

5. The portal of claim 4 wherein said microprocessor has means for assigning buffer descriptors to said receive buffers to thereby identify the location thereof.

6. The portal of claim 5 wherein each frame of Ethernet data includes redundancy check data, and wherein said portal has means for transmitting said redundancy check data for use by a receiving Ethernet controller.

7. A portal for transmitting data between an Ethernet segment and an ATM network, each of said Ethernet segment and ATM network having means for transmitting data in a particularized format, said Ethernet data format being different than said ATM data format, said portal including a dual port shared memory for receiving and storing data from both of said Ethernet segment and said ATM network, an Ethernet controller connected between said Ethernet segment and said memory for transferring data therebetween, said Ethernet controller having means for receiving substantially all data transmitted over said Ethernet segment including means for separating data from an Ethernet frame into discontiguous portions and means for assembling data from discontiguous portions into an Ethernet frame, an ATM cell processor connected between said ATM network and said shared memory, a DMA controller connected therebetween for transferring data between said ATM cell processor and said shared memory, a control microprocessor connected to each of said Ethernet controller, said shared memory, and said DMA controller, and said control microprocessor having means for monitoring and controlling the transfer of data through said portal.

8. The portal of claim 7 wherein Ethernet data is grouped into frames and ATM data is grouped into cells, each Ethernet data frame including a Cyclic Redundancy Check portion, and wherein the Ethernet controller further comprises means for capturing the CRC portion from each Ethernet data frame, and the portal includes means for transmitting said CRC portion along with its associated Ethernet data frame.

9. The portal of claim 8 wherein the portal includes means for inserting said CRC portion into said Ethernet data frame upon reception thereof.

10. The portal of claim 9 wherein said ATM cell processor includes means for converting incoming ATM data from serial to parallel and means for converting outgoing ATM data from parallel to serial.

11. A concentrator for interconnecting between a plurality of Ethernet controllers, each of said Ethernet controllers being connected to an associated subnetwork, and an ATM network, each of said Ethernet subnetworks and said ATM network having means for transmitting data in a particularized format, said Ethernet data format being different than said ATM data format, and means for converting data received in either of said formats to the other of said formats to thereby permit the free flow of data between said Ethernet subnetworks and said ATM network, the data conversion means having means for converting the original data received from either the Ethernet subnetwork in Ethernet format or ATM network in ATM format to the other of said formats without copying of said original data and re-transmitting said re-formatted original data after conversion of its format, means for generating and storing formatting data into said dual port memory so that as said data is stored in said dual port memory it becomes associated with appropriate formatting data to thereby achieve its format conversion, an Ethernet controller connected between each of said Ethernet subnetworks and a first port of said dual port memory, an ATM cell processor connected between said ATM network and a second port of said dual port memory, and a DMA controller connected between each of said Ethernet controllers and ATM cell processor and said dual port memory for transferring data therebetween, said concentrator having means for routing data between Ethernet controllers, and means for multiplexing data from more than one Ethernet controller for transmission over said ATM network, said concentrator including a shared memory in which said data is stored for conversion of its format from Ethernet to ATM, or vice versa, the shared memory including a dual port memory for receiving data from any of the Ethernet subnetworks or the ATM network.

12. The concentrator of claim 11 wherein said data conversion means further comprises a microprocessor connected to said DMA controller for controlling the transfer of data by said DMA controller from said dual port memory.

13. The concentrator of claim 12 wherein said microprocessor has means for partitioning said dual port memory into a plurality of receive buffers, each of said buffers having an associated formatting data of ATM format, each of said Ethernet controllers has means for storing a frame of incoming Ethernet formatted data into said receive buffers to thereby effectively re-format said Ethernet data into ATM data, and said DMA controller has means for transferring the contents of said receive buffer to said ATM cell processor for transmission of said re-formatted data over said ATM network.

* * * * *

UNITED STATES PATENT AND TRADEMARK OFFICE
CERTIFICATE OF CORRECTION

PATENT NO. : 5,457,681
DATED : October 10, 1995
INVENTOR(S) : Michael E. Gaddis; Richard G. Bubenik; Pierre Costa; Noritaka Matsuura It is certified that error appears in the above-indentified patent and that said Letters Patent is hereby corrected as shown below:

Column 5, line 63, substitute --receive buffer descriptors-- for "buffers".

Column 6, line 1, substitute --buffer descriptors-- for "buffers".

Column 6, line 12, substitute --transmit buffer descriptors-- for "buffers".

Column 6, line 14, substitute --transmit buffer descriptors-- for "buffers".

Column 6, line 16, substitute --buffer descriptors-- for "buffers".

Column 6, lines 16-17, substitute --for subsequently-- for "to store subsequent".

Signed and Sealed this

Ninth Day of April, 1996

Attest:

BRUCE LEHMAN

Attesting Officer

Commissioner of Patents and Trademarks